(12) United States Patent
Chu et al.

(10) Patent No.: US 6,360,275 B1
(45) Date of Patent: Mar. 19, 2002

(54) SYSTEM AND METHOD FOR TRANSMITTING AND RECEIVING DATA IN A NETWORK

(75) Inventors: Phillip L. Chu, Sunnyvale; George Guoqiang Lin, Cupertino, both of CA (US)

(73) Assignee: Shanghai Wonders Information Co., Ltd. (CN)

( * ) Notice: Subject to any disclaimer, the term of this patent is extended or adjusted under 35 U.S.C. 154(b) by 0 days.

(21) Appl. No.: 09/183,553

(22) Filed: Oct. 29, 1998

(51) Int. Cl.[7] .............................. H04N 1/00; H04N 7/10
(52) U.S. Cl. ........................ 709/245; 709/219; 707/3
(58) Field of Search .................................. 709/200, 219, 709/221, 245; 707/3, 7; 455/4.2

(56) References Cited

U.S. PATENT DOCUMENTS

| | | | | |
|---|---|---|---|---|
| 5,247,614 A | * | 9/1993 | Eagen et al. ................. | 709/200 |
| 5,295,244 A | * | 3/1994 | Dev et al. .................... | 709/200 |
| 5,515,106 A | | 5/1996 | Chaney et al. .............. | 348/461 |
| 5,754,939 A | * | 5/1998 | Herz et al. ................... | 455/4.2 |
| 5,781,226 A | | 7/1998 | Sheehan ........................ | 348/6 |
| 5,893,091 A | * | 4/1999 | Hunt et al. .................... | 707/3 |
| 6,021,433 A | * | 2/2000 | Payne et al. ................. | 709/219 |

FOREIGN PATENT DOCUMENTS

| | | |
|---|---|---|
| EP | 0680185 | 11/1995 |
| EP | 0827340 | 3/1998 |

OTHER PUBLICATIONS

V.N. Padmanabhan et al: XP000607179; Computer Communication Review; "Using Predictive Prefetching To Improve World Wide Web Latency," Jul. 1, 1996; vol. 26, No. 3; pp. 22–36.

Om Malik, "Out of the Box", Article, Forbes, Sep. 7, 1998, 1 page.

* cited by examiner

Primary Examiner—Ayaz Sheikh
Assistant Examiner—Khanh Quang Dinh
(74) Attorney, Agent, or Firm—Squire Sanders & Dempsey LLP

(57) ABSTRACT

A transmission system and a receiver system enable an internet experience with enhanced content regulation and simplicity. The transmission system comprises a buffer memory storing data-to-be-transmitted which contains channel information. The transmission system further comprises a transmitter for transmitting the stored data based on the channel information, and a repeater coupled to the buffer memory and to the transmitter for repeatedly sending the stored data from the buffer memory to the transmitter. The receiver system comprises a receiver for receiving data packets being transmitted on the multiple channels, a device coupled to the receiver for extracting a data packet from the received data packets based on a comparison of the received data packets and desired packet identification information. The receiver system further comprises a browser coupled to the device for enabling presentation of an extracted data packet, and for enabling selection of an option. The receiver still further comprises a control engine coupled to the browser for managing the desired packet identification information based on the extracted data packet and based on option selection. The transmission system may offer multiple versions of the service, such as a basic version, an extended version and a deluxe version. The receiver system may be configured to receive a version based on a subscription package.

47 Claims, 15 Drawing Sheets

(BUFFER / REPEATER)

(SET TOP BOX)

(START PAGE)

(CONTENT PAGE - 1ST)

(CONTENT PAGE - OTHERS)

(CONTROL PAGE)

SYSTEM AND METHOD FOR TRANSMITTING AND RECEIVING DATA IN A NETWORK

BACKGROUND OF THE INVENTION

1. Field of the Invention

This invention relates generally to data transmission systems, and more particularly provides a system and method for transmitting and receiving data in a network.

2. Description of the Background Art

Cable television and internet television offer viewers both entertainment and intellectual value. Cable television allows a viewer to select a show from a broad range of simultaneous broadcasts. A viewer may review a broadcast guide, select a particular program and then tune-in to the proper channel. Alternatively, a viewer may flip through the channels until a program appears interesting. Internet television allows a user to "surf" a network, by connecting a set top box to the network and to the viewer's television. The viewer interacts with the set top box, which responsively establishes communications channels with connected network servers. Accordingly, the viewer can receive and review an almost infinite amount of information.

Governments are concerned about providing internet television because its content is not regulated easily. A viewer can connect to any one of millions of servers to receive unregulated data. Thus, it is difficult for a government to control what each viewer sees on the internet. Governments prefer cable television, because its content can be supervised. For example, in China, the television broadcast industry is regulated by the Ministry of Radio, Film and Television (MRTF). The MRTF has licensed over 2000 cable television broadcasters, the three largest broadcasters being located in Shanghai, Beijing and Tianjin. The MRTF sets cable television subscription fees, allowing for variations based on locality, and regulates cable television broadcast content of each ministry. Accordingly, a system and method are needed that provide a user with an internet experience, but with the content regulation capability of cable television.

SUMMARY OF THE INVENTION

The present invention provides an advanced Internet & digitized video content delivery system through which application programs can be quickly sent to millions of households in an affordable way over an existing cable TV infrastructure. The system includes a transmitter and a receiver.

The receiver includes an advanced TV set-top box which receives Internet program broadcast from the transmitter. The box can receive many application channels being broadcast from the transmitter simultaneously. The box can intelligently filter out irrelevant information and display contents in anti-alias mode that reduce the flicking effects of an ordinary TV set. With a remote control, a user can extract the application channel of interests, surfing them at fast speeds. The receiver has full Internet browsing capability. At the heart of the box is the core technology that enables faster and more efficient content delivery. This key technology allows various Internet applications to be delivered to a TV set at the same time. Users can thus surf among Internet applications channels with a remote control which resembles a regular one for TV. The receiver receives control information from the transmitter, receives Internet contents from the transmitter, caches most recent/related information for the current active channel, formats and displays selected contents on TV with-Anti-flicking technology, sets initial/default application channel contents, manages local & incoming Internet files in an optimizing way, process user requests through a remote controller, and manages local memory content.

The transmitter is responsible for obtaining, reformatting and delivering Internet contents. The transmitter schedules the application programs and stages them to a master insertion system through which the programs are broadcast. The transmitter also manages user profiles and program packages. The transmitter obtains targeted contents from Internet, formats contents for insertion, schedule content delivery, sets up transmitter configurations, updates box configurations, updates transmitter configurations, allocates application channels, manages contents to be delivered, and manages user profile and package. The transmitter complies fully with the DVB/DAVIC standard, supports constellations up to 256-QAM, formats the equalized data which is then fed into a DVB/DAVIC compliant synchronization block, de-interleaver, Reed_Solomon FEC, and de-randomizer. The final error-corrected output is delivered in MPEG-2 transport format.

As indicated by the claims, the present invention provides a transmission system and a receiver system. The transmission system comprises a buffer memory storing data-to-be-transmitted, which contains channel information, a transmitter for transmitting the stored data based on the channel information, and a repeater coupled to the buffer memory and to the transmitter for repeatedly sending the stored data from the buffer memory to the transmitter. The receiver system comprises a receiver for receiving data packets being transmitted on multiple channels, a device coupled to the receiver for extracting a data packet from the received data packets based on a comparison of the received data packets and desired packet identification information, a browser coupled to the device for enabling presentation of an extracted data packet, and for enabling selection of an option, and a control engine coupled to the browser for managing the desired packet identification information based on the extracted data packet.

As further indicated by the claims, the present invention further provides a transmitter method and a receiver method. The transmitter method comprises storing data-to-be-transmitted, which contains channel information, selecting a transmission channel based on the channel information, and transmitting repeatedly the stored data on the selected transmission channel. The receiver method comprises receiving a data packet being transmitted on a first channel, comparing the data packet against desired packet identification information to determine if the data packet is desired, selecting the data packet if the data packet is desired, and managing the desired packet identification information based on a selected data packet.

With this system, cable operators can deliver additional value-added service to customers by delivering interesting and entertaining contents quickly to millions of households. Consumers can obtain the Internet experience without a computer that is difficult to use and expensive to buy. Moreover, content providers can accomplish much higher exposure and faster vehicle to effectively deliver contents.

DETAILED DESCRIPTION OF THE PREFERRED EMBODIMENT

The present invention enables a head end system to repeatedly broadcast all data one-way to viewer systems. Each viewer system can tune-in to the channels to retrieve the data. Because the head end system repeatedly broadcasts all available data, the viewer system need only know from what channel to extract the specific data desired. A viewer/user selects the specific data desired, and the viewer system automatically extracts the selected data from the data being broadcast. The selected data can then be presented on the viewer/user's television or on any other presentation device.

Figure 1:
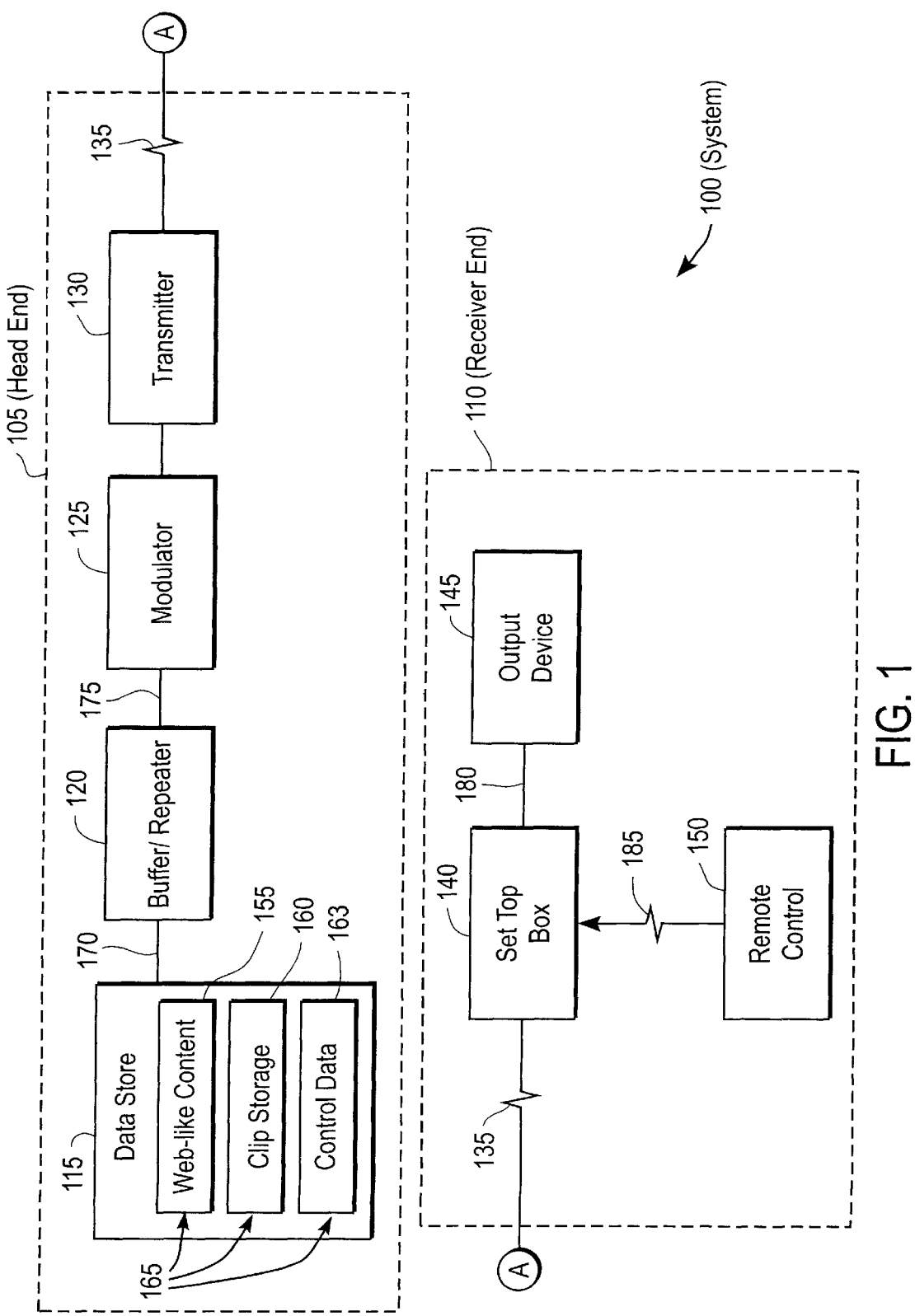
FIG. 1 is a block diagram illustrating a network system, in accordance with the present invention.

FIG. 1 is a block diagram illustrating a network system 100 in accordance with the present invention. The network system 100 includes a head end 105 coupled via a transmission line 135 to a receiver end 110. The head end 105 includes a data store 115, a buffer repeater 120 coupled via a first communications channel 170 to the data store 115, a modulator 125 coupled via a second communications channel 175 to the buffer/repeater 120, and a transmitter 130 coupled to the modulator 125 and to the transmission line 135. It will be appreciated that the terms "channel," "line" and "bus" are being used herein interchangeably to include any mode of communicating information from one node to another.

The data store 115 stores data-to-be-transmitted 165. Example data-to-be-transmitted 165 includes web-like content 155 such as HTML data, multimedia data, pictures, files, applets, ActiveX™ control, etc. and includes clip storage 160 such as movies, music, slide shows, etc. The data-to-be-transmitted 165 may be loaded onto the data store 115 using conventional techniques, such as via a floppy disk, via a compact disk or via a connection to a network, e.g., the wide area network commonly referred to as "The Internet." A head end manager (not shown) may select the data-to-be-transmitted 165, and may input the data 165 to the data store 115.

It will be appreciated that the data-to-be-transmitted 165 may include any data that is manageable by a browser engine (625, FIG. 6) at the receiver end 110. It will be further appreciated that the data-to-be-transmitted 165 is preferably first converted to "one-way data." That is, one-way data 165 preferably does not request the receiver end 110 to send information back to the head end 105. For example, the system 100 does not implement a two-way communications link or handshaking protocol between the head end 105 and receiver end 110. Alternatively, the data 165 may include and the receiver end 110 may ignore such requests. It will be still further appreciated that the data store 115 may also contain data that is not to be transmitted.

Figure 13:
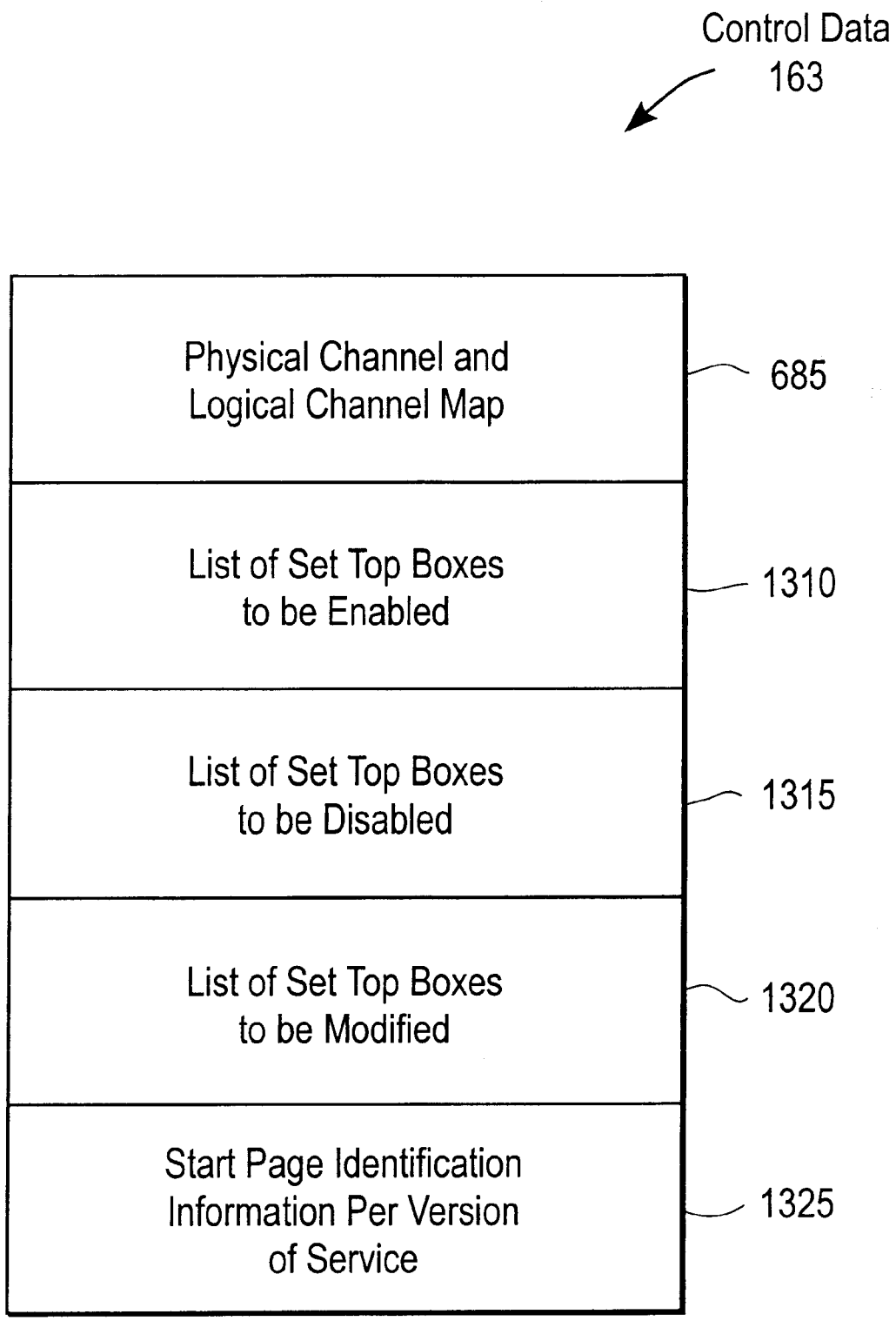
FIG. 13 is a block diagram illustrating a control page.

The data-to-be-transmitted 165 may also include control data 163, such as the control data 163 (FIG. 13). The control data 163 is used when the head end 105 offers multiple versions of the service, such as a deluxe version, an extended version and a standard version. Based on the version selected/purchased by the viewer/user, the control data 163 enables the receiver end 110 to receive the selected/purchased version.

Generally, the buffer/repeater 120 receives or retrieves the data-to-be-transmitted 165 from the data store 1 5. The buffer/repeater 120 stores and repeatedly transmits the data 165 via the second communications channel 175 to the modulator 125. In the preferred embodiment, the buffer/repeater 120 is sufficiently large to store all the data-to-be-transmitted 165. The buffer/repeater 120 is described in detail with reference to FIG. 5.

The modulator 125 receives the data-to-be-transmitted 165 from the buffer/repeater 120, and converts the data 165 from a digital to an analog signal. It will be appreciated that, for example, a QAM-64 or QAM-1024 modulation scheme may be used. The QAM-64 modulator 125 transmits data at forty (40) megabits (Mb) per second or five (5) megabytes (MB) per second. Accordingly, the QAM-64 modulator 125 can send one hundred megabytes (100 MB) of data in twenty (20) seconds. It will be appreciated that the QAM-1024 modulator 125 sends data twenty (20) times faster than the QAM-64 modulator 125, and thus could send the 100 MB of data in one (1) second. The modulator 125 forwards the analog data-to-be-transmitted 165 to the transmitter 130.

The transmitter 130 transmits the analog data-to-be-transmitted 165 to the transmission line 135 on multiple (N) channels, preferably, using MPEG-2 format and protocol, although another format and protocol may alternatively be used. The transmitter 130 may be based on the type of transmission line 135. For example, if the transmission line 135 includes a coaxial cable, transmitter 130 may include a coax interface. Similarly, if the transmission line 135 includes a satellite link, the transmitter 130 may include a microwave frequency interface. It will be appreciated that the buffer/repeater 120, modulator 125 and transmitter 130 preferably transmit data 165 at the same speed, so that no data 165 is lost or compromised.

Figure 2:
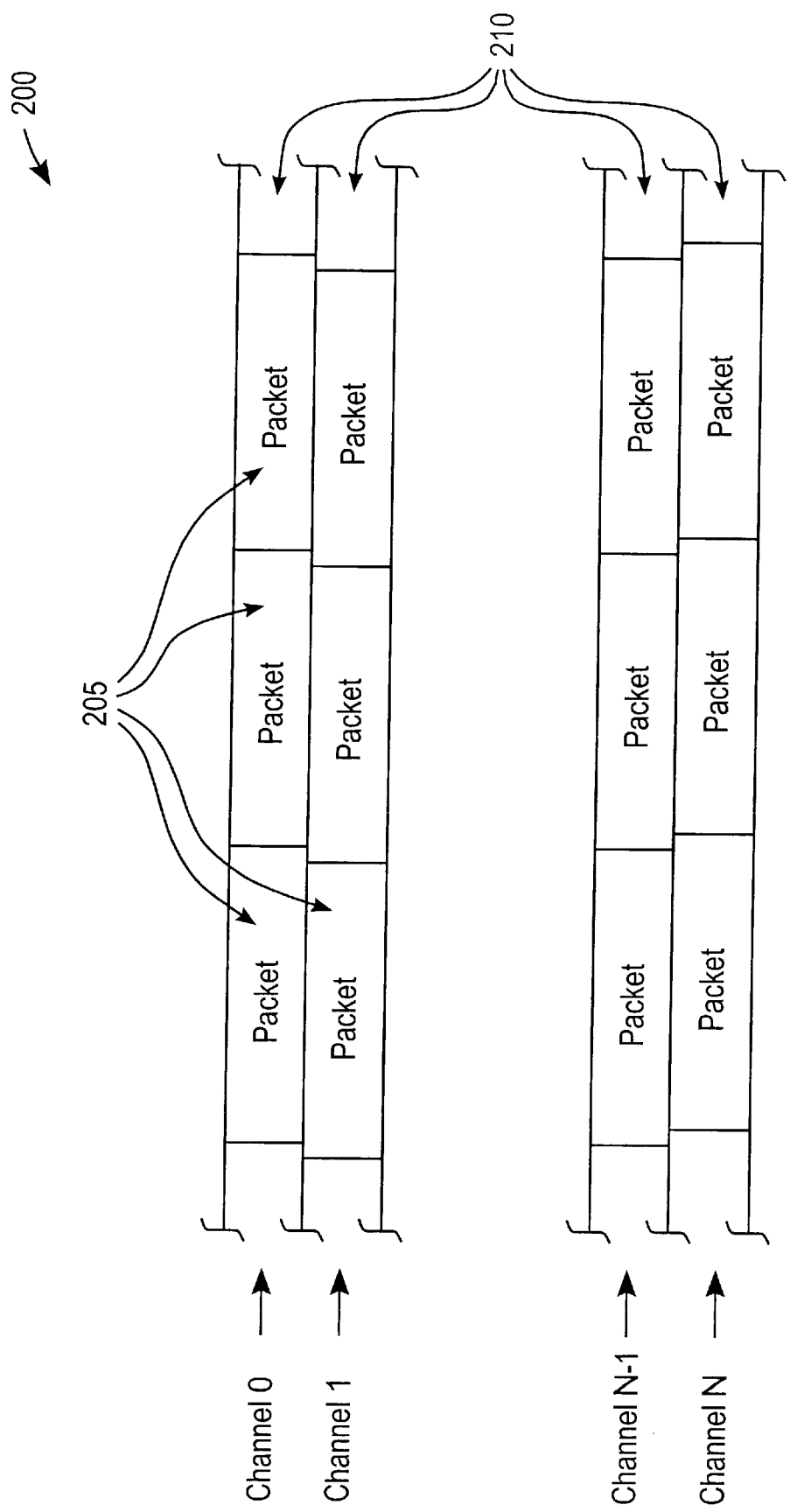
FIG. 2 is a block diagram illustrating details of data being transmitted.

FIG. 2 is a block diagram illustrating details of data-being-transmitted 200 by the transmitter 130. As illustrated, the data-being-transmitted 200 includes multiple packets 205 being transmitted on multiple (N) channels. More particularly, the data-being-transmitted 200 includes multiple packets 205 being transmitted on channel 0, multiple packets 205 being transmitted on channel 1, etc. In the embodiment described herein, there is 256 channels 210, and each packet 205 contains 188 bytes of information with the first byte being used for synchronization. Four different types of packets 205 are described in detail with reference to FIGS. 7–10.

Referring again to FIG. 1, the receiver end 110 includes a set top box 140 coupled to the transmission line 135, an output device 145 coupled via a third communications channel 180 to the set top box 140, and a remote control 150 coupled via a fourth communications channel (e.g., a radio frequency link) 185 to the set top box 150. Generally, the set top box 140 receives input from the remote control 150 indicating the specific data the viewer desires to be presented on the output device 145. It will be appreciated that the specific data from which the viewer can select may depend on control data 163 being sent. For example, if the viewer subscribes to a basic version instead of a deluxe version, the viewer may not be enabled to select certain data. Using control data 163 is described in greater detail below. The set top box 140 tunes-in to the channels 210 to receive all databeing-transmitted 200 on transmission line 135. Based on the selection by the viewer, the set top box 140 extracts and forwards the specific data desired to the output device 145, which accordingly presents (displays, plays, etc.) the data. The set top box 140 is described in greater detail with reference to FIG. 5.

Figure 3:
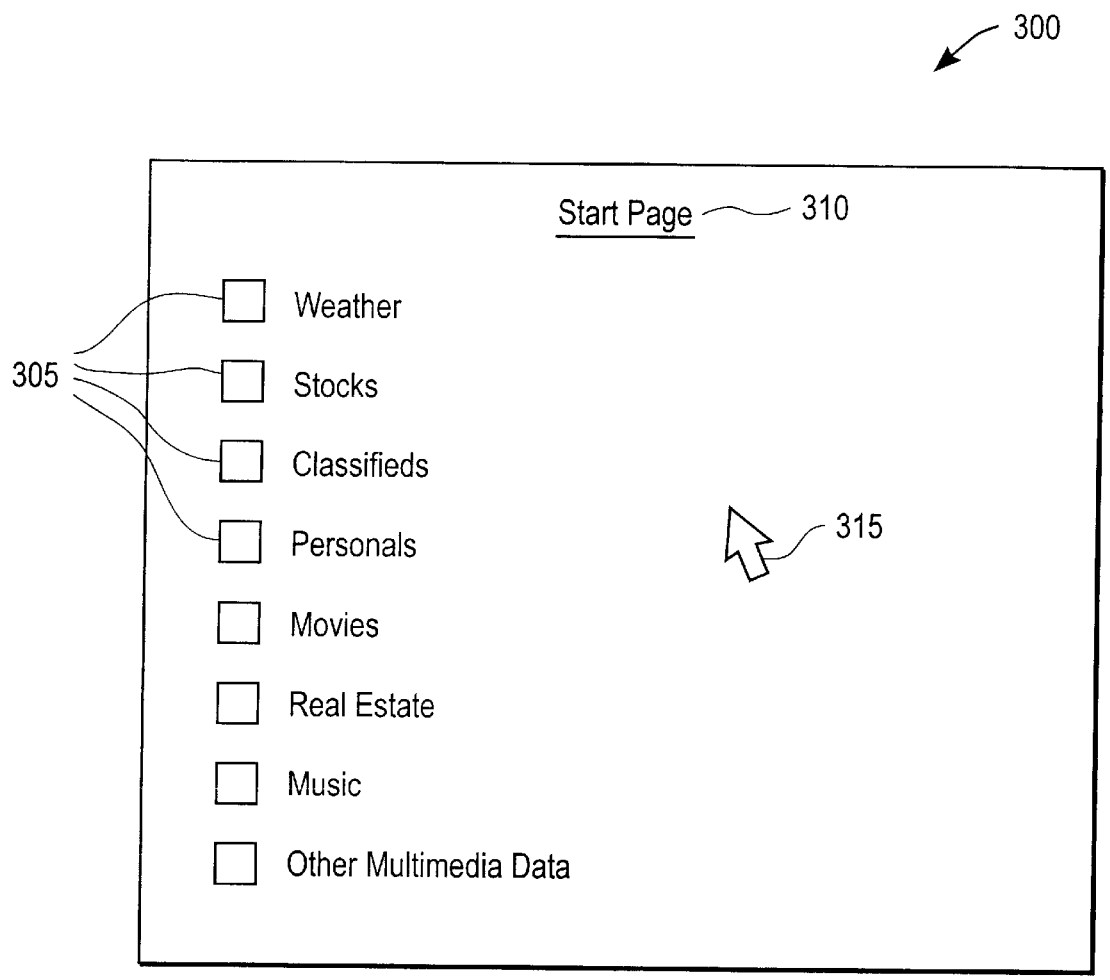
FIG. 3 is a block diagram illustrating a start page window.

FIG. 3 is a block diagram illustrating a start page window 300, which includes a title 310 and several options 305 from which to select content pages or specific data to be presented. For example, the several options 305 include "Weather," "Stocks," "Classifieds," "Personals," "Movies," "Real Estate," "Music" and "Other Multimedia Data." The start page window 300 further includes a cursor 315 which is controlled by the remote control 150. Using the remote control 150 and cursor 315, a viewer/user (not shown) can select one of the several options 305. As stated above, the options 305 available may depend on the control data 163 being transmitted. It will be appreciated that the packet 205 containing the start page data may be transmitted on a predetermined channel, e.g., channel 0, known to the set top box 140. Thus, the set top box 140 would always be capable of finding the starting point within the data-being-transmitted 200 at which to begin its presentation.

In the embodiment with multiple versions of services, the set top box 140 is configured to first obtain the control data 163, which indicates the particular start page window 300 to present. The set top box 140 receives the control data 163 behind the scenes. The control data 163 includes a set top box address and a corresponding version of service. The set top box 140 recognizes its version of service, and accordingly extracts the channel and page IDs for the start page window 300. FIG. 13 is a block diagram illustrating details of control data 163. Control data 163 includes a physical channel and logical channel map 685, a list 1310 of set top boxes to be enabled, a list 1315 of set top boxes to be disabled, a list 1320 of set top boxes to be modified, and start page identification information per version information 1325. The list 1310 of set top boxes to be enabled and the list 1320 of set top boxes to be modified includes version of service information for each set top box. Thus, the start page can easily be determined for each set top box 140.

The channel and page IDs for retrieving the page data for the content pages identified by the options 305 are also stored in the start page data. Thus, upon selection of an option 305, the set top box 140 will know from which channel to retrieve the page data for the selected option 305. To increase speed, the set top box 140 may retrieve and cache the page data for all content pages identified by options 305. Retrieving page data for a selectable option 305 is described in greater detail with reference to FIGS. 12A, 12B and 12C.

Figure 4:
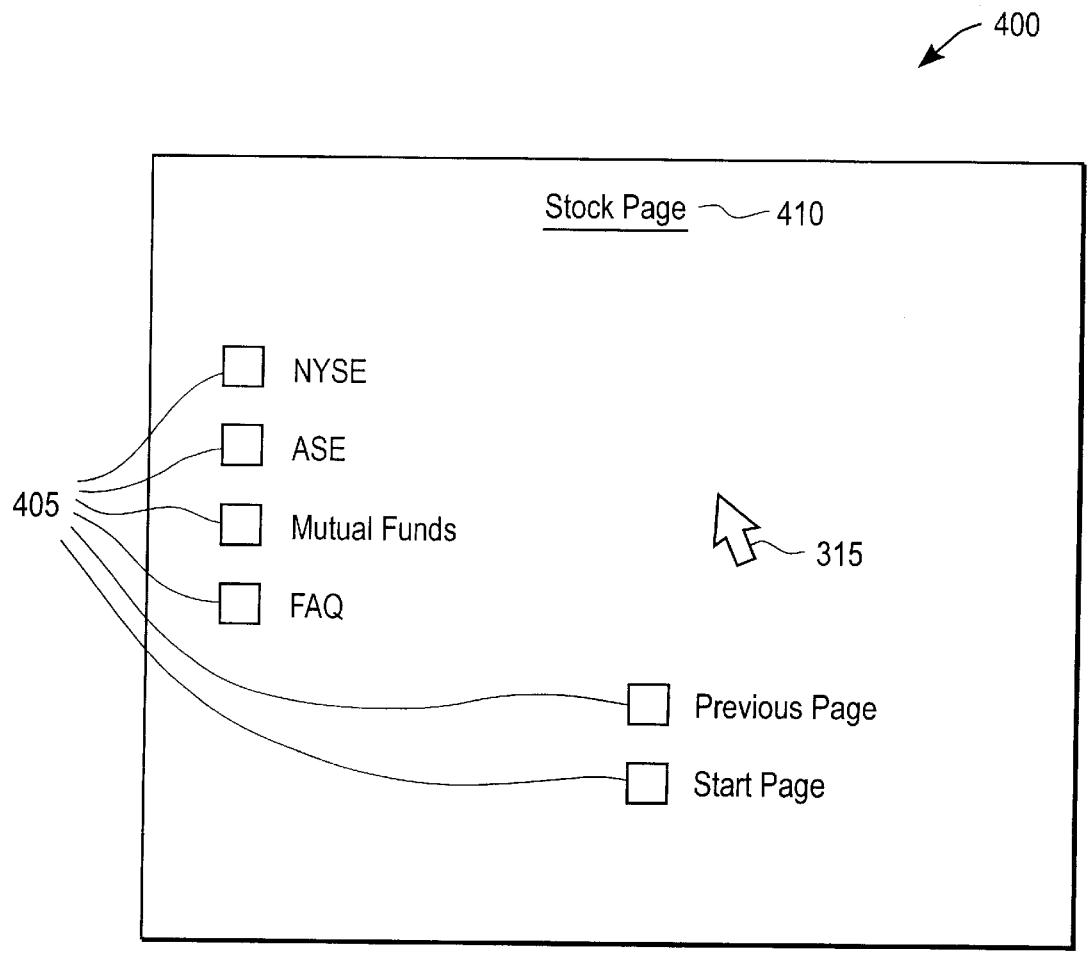
FIG. 4 is a block diagram illustrating a stock page window.

FIG. 4 is a block diagram illustrating a content page 400 for stocks, which is presented upon selection of the "Stocks" option 305 from window 300 (FIG. 3). For example, the content page 400 includes a title "Stock Page" and the options 405 "NYSE," "ASE," "Mutual Funds," "FAQ," "Previous Page" and "Start Page." It should be noted that, in this example, previous page and start page indicate the same page. The content page 400 further includes the cursor 315, still controlled by the remote control 150. As stated above, the stock page data will be sent on a channel identified within the start page data. Accordingly, upon selection of the stock page option 305, the set top box 140 will know the channel having the stock page data, and will retrieve the stock page data therefrom. Examples of these links between a current page and a possible future page are shown and described with reference to FIGS. 7–10.

Figure 5:
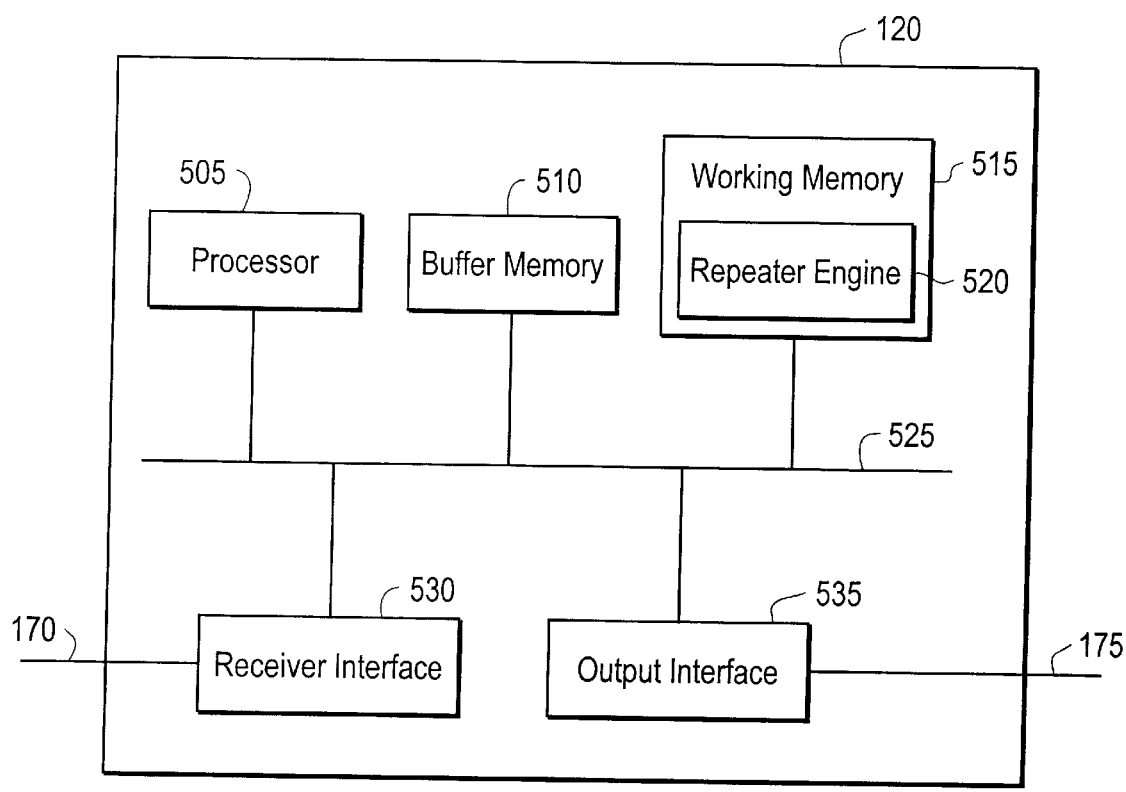
FIG. 5 is a block diagram illustrating details of the buffer/repeater of FIG. 1.

FIG. 5 is a block diagram illustrating details of the buffer/repeater 120. The buffer/repeater 120 includes a processor 505, such as an Intel Pentium® microprocessor or a Motorola Power PC® microprocessor, coupled to a communications bus 525. The buffer/repeater 120 further includes a buffer memory 510 for storing the data-to-be-transmitted 165, and working memory 515 storing a repeater engine 520, each coupled to the communications bus 525. The working memory 515 may be random access memory (RAM), read-only memory (ROM), hard disk, etc. or combinations thereof. The buffer/repeater 120 further includes a receiver interface 530 coupled to the communications bus 525 and via communications channel 170 to the data store 115 for receiving data-to-be-transmitted 165 from the data store 115. The buffer repeater 120 also includes an output interface 535 coupled to the communications bus 525 and via communications channel 175 to the modulator 125 for transmitting the data-to-be-transmitted 165 to the modulator 125.

The repeater engine 520 retrieves or receives the data-to-be-transmitted 165 via the receiver interface 530 and stores the data 165 in the buffer memory 510. The repeater engine 520 repeatedly transmits the data 165 in the buffer memory 510 via the output interface 535 to the modulator 125. It will be appreciated that the repeater engine 520 is configured to send the data 165 at the same speed that the modulator 125 sends the data 165, so that no data 165 is lost or compromised. Although the repeater engine 520 is being described as software, one skilled in the art will recognize that the repeater engine 520 may be implemented in hardware such as in an application-specific integrated circuit (ASIC).

One skilled in the art will recognize that the buffer/repeater 120 may further include an operating system (not shown), which may be stored in ROM 515, for controlling processing by the processor 505. One skilled in the art will further recognize that the buffer/repeater 120 may also include additional elements, such as network connections, additional memory, additional processors, LANs, input/output lines for transferring information across a hardware channel, the Internet or an intranet, etc. One skilled in the art will also recognize that the programs and data may be received by and stored in the buffer/repeater 120 in other ways. For example, the receiver interface 530 may include a computer-readable storage medium (CRSM) reader (not shown) such as a magnetic disk drive, hard disk drive, magneto-optical reader, CPU, etc. for receiving data 165 from a computer-readable storage medium (CRSM) such as a magnetic disk, a hard disk, a magneto-optical disk, RAM, etc. Similarly, the buffer/repeater 120 may include a compact disk (CD) and CD-ROM drive or a tape and tape drive for repeatedly sending data 165 to the modulator 125.

Figure 6:
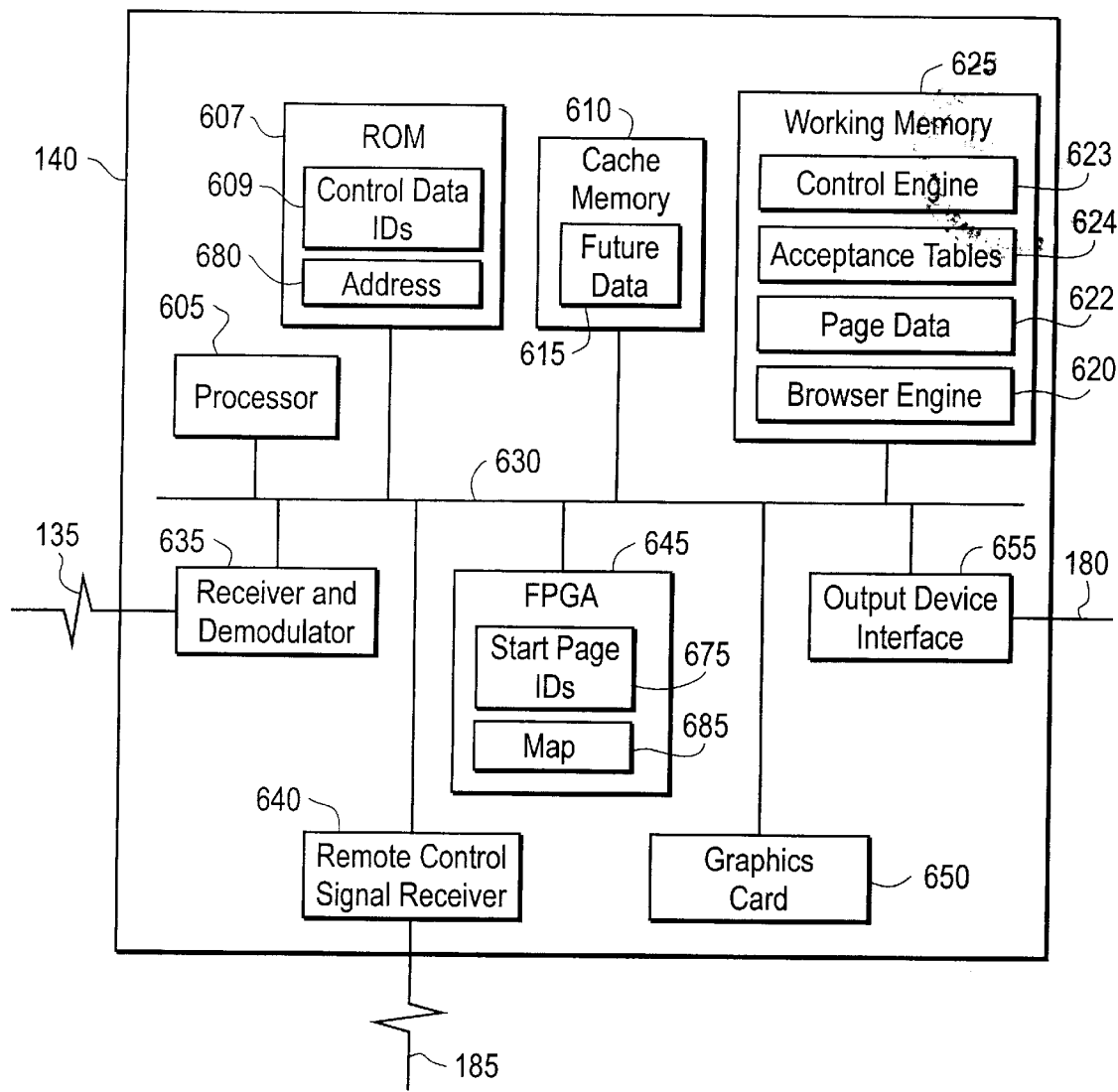
FIG. 6 is a block diagram illustrating details of the set top box of FIG. 1.

FIG. 6 is a block diagram illustrating details of the set top box 140. The set top box 140 includes a processor 605, such as an Intel Pentium® microprocessor or a Motorola Power PC® microprocessor, coupled to a communications bus 630. The set top box further includes read-only memory 607, cache memory 610 and working memory 620, each coupled to the communications bus 630. It will be appreciated that the working memory 620 may be random access memory (RAM), read-only memory (ROM), hard disk, etc. or combinations thereof. It will be appreciated that the cache memory 610 may be any fast read/write memory. The set top box 140 further includes a receiver and demodulator 635, a remote control signal receiver 640, a field-programmable gate array (FPGA) 645, a graphics card 650 and an output device interface 655, each also coupled to the communications bus 630.

The receiver and demodulator 635 is coupled to the transmission line 135 for receiving all data-being-transmitted 200 on the transmission line 135. The receiver and demodulator 635 tunes-in to each of the channels, receives the data 200, and forwards the data 200 to the FPGA 645. It will be appreciated that the receiver and demodulator 635 may be hardware or software. The FPGA 645 de-packetizes the data 200 into the packets 205. In the embodiment having multiple versions of services, the FPGA 645 compares the channel and page IDs of the data packet 205 against known control data channel and page IDs 609 stored in ROM 607 to determine whether the data packet 205 includes control data 163. If the data packet 205 is a control packet, then the FPGA 645 compares an address 680 dedicated to the set top box 140, which is stored in the ROM 607, against lists of addresses within the packet 205 indicating set top boxes 140 to be enabled, modified and disabled. If the address matches one on the list of a set top box 140 to be enabled or modified, then the FPGA 645 stores new start page IDs 675 and optionally a new map 685 corresponding physical channels to logical channels. If the address 680 matches an address of a set top box 140 to be disabled, then the FPGA 645 disables itself by setting a flag or by deleting the start page IDs 675.

In the embodiment having only one version of service, the FPGA 645 or ROM 607 may store the start page channel and page IDs 675 without storing control data IDs 609. Accordingly, the start page is known. No comparisons need be performed. In yet another embodiment, control data 163 may be contained within the start page indicating whether to enable or disable a set top box 140.

If the data packet 205 does not contain control data 163, then the FPGA 645 compares the data packet 205 either against the start page IDs 675 identifying start page data or against acceptance tables 624 identifying specific data desired by the set top box 140. It will be appreciated that the start page IDs 675 may be transferred into the acceptance tables 624, and a comparison performed with the data within the acceptance tables. If a match occurs, then the FPGA 645 forwards the start page data or specific data desired to the workspace memory 620 or cache memory 610, as described below. Although the set top box 140 is being described as having an FPGA 645, one skilled in the art will recognize that any device, hardware or software, for performing de-packetization and comparisons may alternatively be used.

At system 100 start up (post configuration by control data 163), the FPGA 645 compares the data 200 against the start page IDs 675 stored in the FPGA 645. If the data 200 matches, then the FPGA 645 transmits the start page data to the working memory 620 as page data 622. The FPGA 645 also compares the data 200 against current page and future page acceptance tables 624 stored in working memory 620 and generated by control engine 623. Generation of the acceptance tables 624 is described below. If the data 200 corresponds to data identified by the acceptance tables 624, then the FPGA 645 sends the data to the working memory 620 as page data 622 or to the cache memory 610 as future data 615, as described below. At start up, the acceptance tables 624 are effectively empty, although the start page IDs 675 may be transferred to the acceptance tables 624 so that the start page can be retrieved.

After storing the start page data in the working memory 620 as page data 622, the control engine 623 retrieves link page information from the start page data. This link page information identifies selectable pages corresponding to the selectable options 305 (FIG. 3) and may identify other components of the current page (such as pictures, applets, music, clips, etc.). The control engine 623 adds the link page information to the acceptance tables 624. More particularly, the control engine 623 adds each distinct link page message into a current page table 624 if it corresponds to the current page and into a future page table if it corresponds to a page selectable from the current page. Accordingly, the FPGA 645 will send the page data for the future pages identified by the link page information in the future page acceptance table 624 to the cache memory 610 as future data 615. The FPGA 645 will send the page data for the current page identified by the link page information in the current page acceptance table 624 to the working memory as page data 622.

The browser engine 625 uses the page data 622 to generate network pages for display on the output device 145. The data may be HTML data, which is interpreted by the browser engine 625 to generate the network page. The browser engine 625 operates in conjunction with the graphics card 650 to generate a bitmap display and refresh schedule. The graphics card 650 sends the bitmap display via the output device interface 655 to the video output device 145 for presentation. The browser engine 625 may operate in conjunction with a multimedia engine (not shown) to generate music data, movie data, etc., which is sent to the output device 145 for presentation. It will be appreciated that the browser engine 625 may include the multimedia engine. The browser engine 620 displays a cursor, such as the cursor 315 (FIG. 3) on the video output device 145, and monitors signals from the remote control 150 via the remote control signal receiver 640. Based on these signals, the browser 620 manipulates the position of the cursor 620, recognizes "click" events selecting options 305/405, and informs the control engine 623 of the option 305/405 selection. The remote control 150 enables a viewer/user to manipulate the position of the cursor 315, to scroll the network page being displayed, to select options 305/405, etc. The signals are transmitted from the remote control 150 via the remote control signal receiver 640 to the browser engine 625 for processing.

Upon selection of an option 305/405, the control engine 623 reorganizes the page data 622 and future data 615 as available and generates new current and future page acceptance tables 624. More particularly, if available, the control engine 623 transfers the data corresponding to the selected page from the future data 615 in cache memory 615 to the page data 622 in the working memory 620. Transferring data from the cache memory 610 increases the speed of processing the viewer's request. The control engine 623 transfers the link page information for the requested page from the future page acceptance table 624 to the current page acceptance table 624. Thus, if the future data 615 does not contain the data needed for the requested page, the FPGA 645 will transfer and store the page data for the requested page to the working memory 620 as page data 622.

Again, the control engine 623 retrieves the link page information from the new page data 622, and will build current and future page acceptance tables 624. The FPGA 645 resumes comparing and sending the appropriate data to the working memory 620 as page data 622 and to the cache memory 610 as future data 615 as described above. The browser engine 625 generates the new network page, e.g., the stock page window 400.

Figure 7:
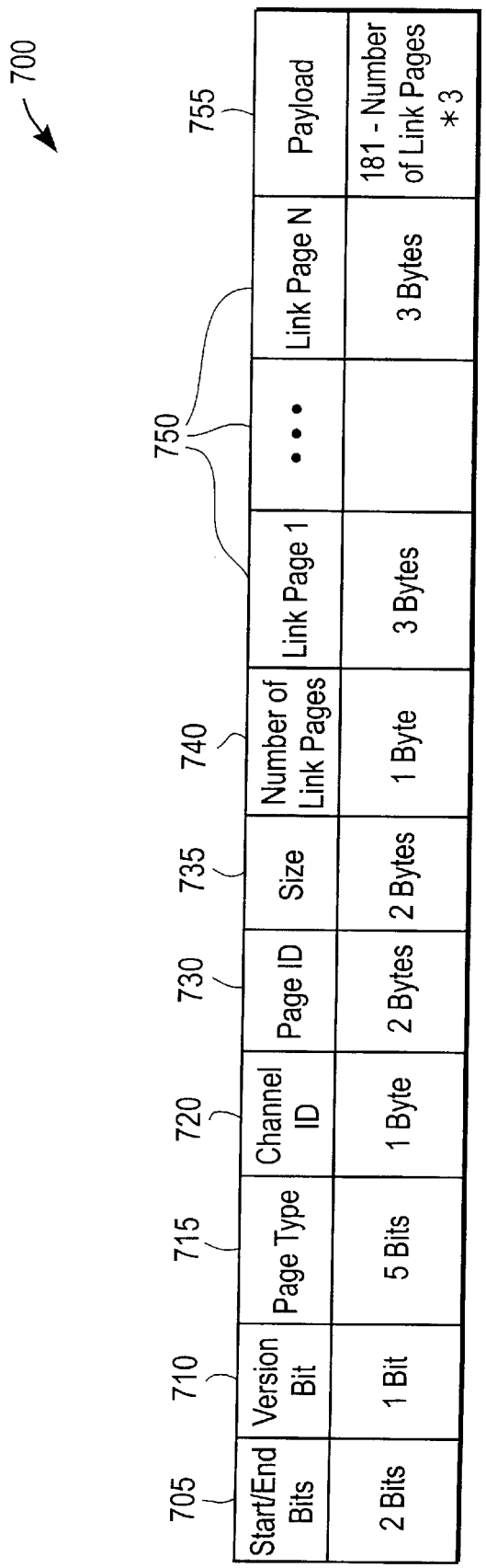
FIG. 7 is a block diagram illustrating a start page data packet contained within the data being transmitted of FIG. 2.

FIG. 7 is a block diagram illustrating an instance of a data packet 205 for generating the start page window 300 (FIG. 3), referred to herein as data packet 700. Data packet 700 includes two (2) start/end bits 705, a one (1) bit version 710, a five (5) bit page type 715, a one (1) byte channel ID 720, a two (2) byte page ID 730, a two (2) byte size 735, a one (1) byte number of link pages 740, a number (N) of three (3) byte link pages 750, and a payload 755. The page type 715 indicates the type of data, such as text, picture, movie, music, etc., contained in the packet 700. The channel ID 720 identifies the logical channel 210 in which the data packet 700 is being sent. It will be appreciated that many packets on many logical channels 210 may be sent on a single carrier wave at a single frequency range. The channel ID 720 also indicates at which frequency this channel 210 should be included. When sorting packets 205, the FPGA 645 compares the channel ID 720 with channel IDs contained in the acceptance table 624 or with the start page IDs 675. The page ID 730 identifies the particular packet within the channel 210 as belonging to a particular network page, in this case as belonging to the start page window 300. Again, when sorting packets 205, the FPGA 645 compares the page ID 730 with page IDs contained in the acceptance tables 624 or with the start page IDs 675. The size 735 indicates the packet size including the header for the start page window 300. The number of link pages 740 indicates the number of other pages, corresponding to options 305, that can be selected from the start page. The link pages 750 include the channel ID and page ID for the selectable pages. The payload 755 includes the page data for the start page.

According to the above protocol, the system 100 can have up to 256 channels, wherein each channel can have up to 65K pages, and wherein each page can contain up to 65K bytes. It will be appreciated that, in an embodiment, channels 2–32 will be in a first frequency, channels 33–64 will be in a second frequency, channels 65–96 will be in a third frequency, channels 97–128 will be in a fourth frequency, channels 129–160 will be in a fifth frequency, channels 161–192 will be in a sixth frequency, channels 193–224 will be in a seventh frequency and channels 225–256 will be in an eighth frequency. Channel 1 will include the start page or the control page (FIG. 13) which identifies the start page, and will be available in all frequencies. In any case, a known channel will provide the starting point for entry into the data-being-transmitted 200.

Figure 8:
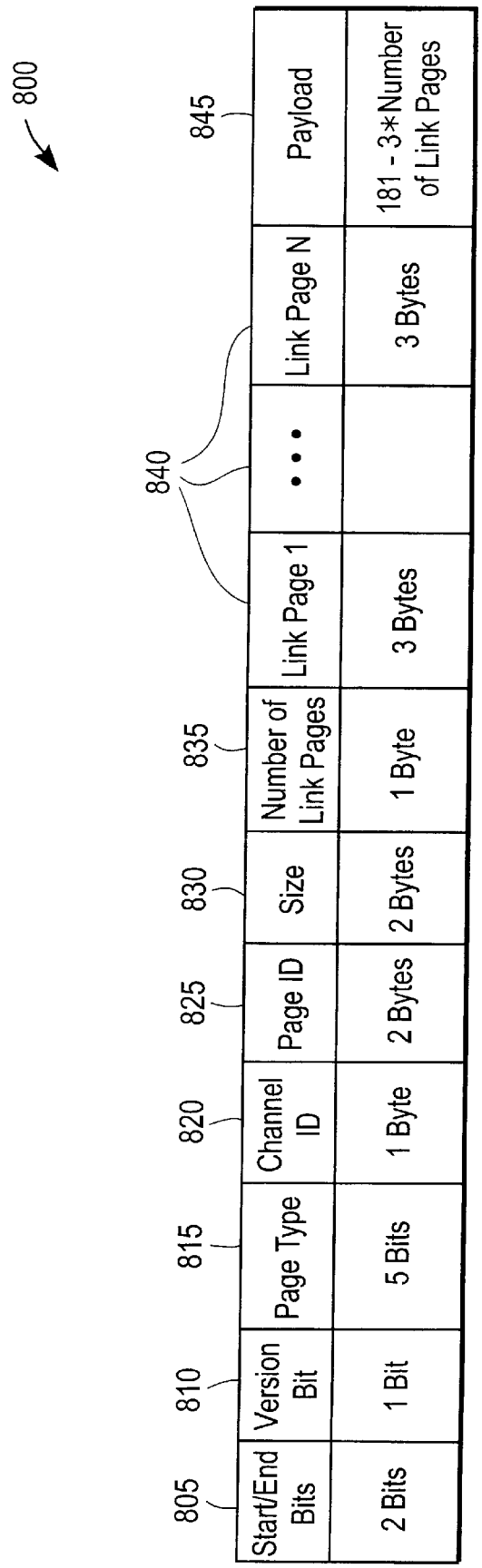
FIG. 8 is a block diagram illustrating a content page data packet within the data being transmitted of FIG. 2 for a first page.

FIG. 8 is a block diagram illustrating an instance of a data packet 205 for generating a content page (first packet for the page), referred to herein as data packet 800. The first page content page refers to every page other than the start page. Similar to the data packet 700, the data packet 800 includes two (2) start/end bits 805, a one (1) bit version 810, a five (5) bit page type 815, a one (1) byte channel ID 820, a two (2) byte page ID 825, a two (2) byte size 830, a one (1) byte number of link pages 835, a number (N) of three (3) byte link pages 840, and a payload 845.

Figure 9:
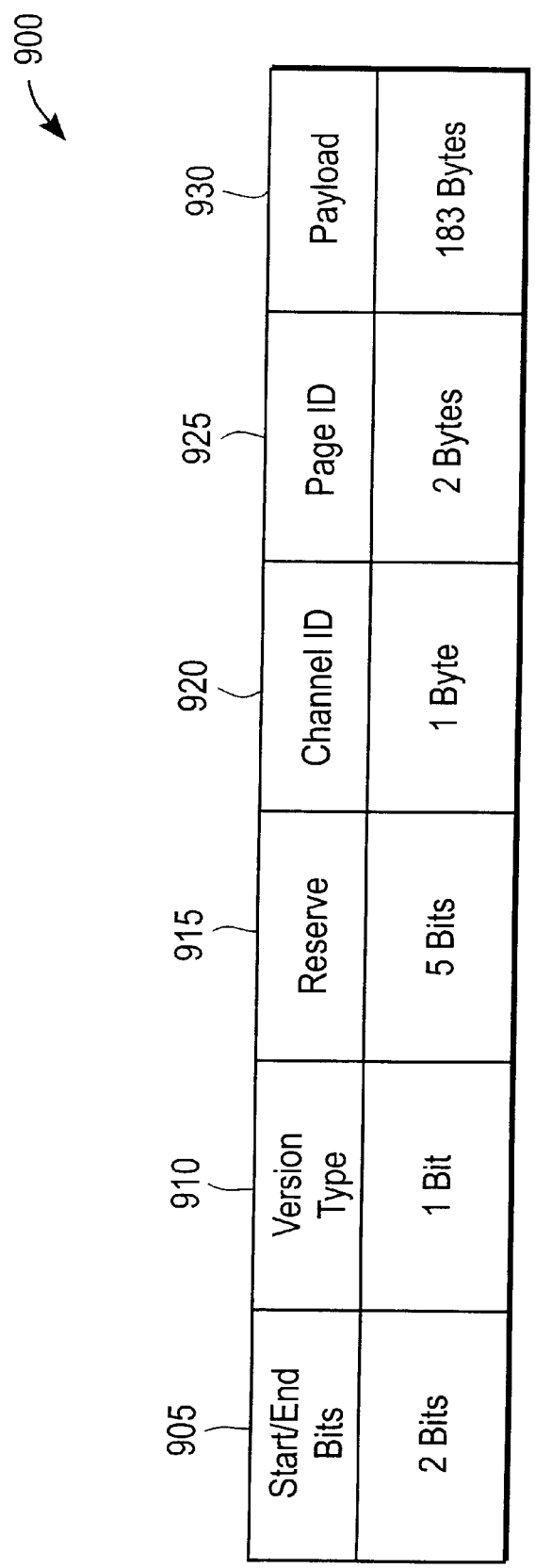
FIG. 9 is a block diagram illustrating a content page data packet within the data being transmitted of FIG. 2 for all other pages.

FIG. 9 is a block diagram illustrating another instance of a data packet 205 for a content page (other packets for the same page), referred to herein as data packet 900. Data packet 900 does not need the same header information as the data packet 800. Data packet 900 includes two (2) start/end bits 905, a one (1) bit version type 910, five (5) bits reserve 915, a one (1) byte channel ID 920, a two (2) byte page ID 925 and a 183 byte payload 930.

Figure 10:
FIG. 10 is a block diagram illustrating a control page data packet within the data being transmitted of FIG. 2.

FIG. 10 is a block diagram illustrating yet another instance of a data packet 205 for control data 163, referred to herein as data packet 1000. The control data 163 may be part of the start page. The data packet 1000 includes two (2) start/end bits 1005, a one (1) bit version 1010, a five (5) bit page type 1015, a one (1) byte channel ID 1020, a two (2) byte page ID 1025, a two (2) byte size 1030, a one (1) byte number of link pages 1035 equal to one, only one (3) byte link page 1040, and a 177 byte payload 1045. The payload 1045 includes the two (2) byte Box ID identifying the set to box address 680, a seven (7) byte time of day identifying the current time for synchronization purposes, and like information. The payload 1045 also includes the elements listed in FIG. 13.

It will be appreciated that the control page packet 1000 may include protocol information (not shown) for retrieving packets 205. Thus, the set top box 140 may first retrieve the control packet 1000 on a known channel 210 using a known protocol. The control packet may inform the set top box 140 of the new and improved protocol to use when downloading all future packets 205. The control packet 1000 may then request selection of an options package. Selection may be based on a preset signal hardwired in the set top box 140. Based on the embodiment used, either the control packet 1000 will indicate the start page to use or the set top box 140 will know the start page window 300 to use.

As stated above, the control data 163 may identify the start page. The user contacts the head end manager, e.g., via telephone, and request an options package, e.g., standard, extended or deluxe. Selection of a particular version indirectly selects the particular start page that will be available to the viewer/user. For example, the standard package may offer only some options 305. The extended version may offer more options 305. The deluxe package may offer all options 305. Similarly, the different packages may offer different options 405 in content pages. If the system 100 uses multiple versions of services, then control page IDs 609 will identify the control data 163, the control data 163 will identify the selected start page, the selected start page will identify the selectable content pages, etc.

Figure 11:
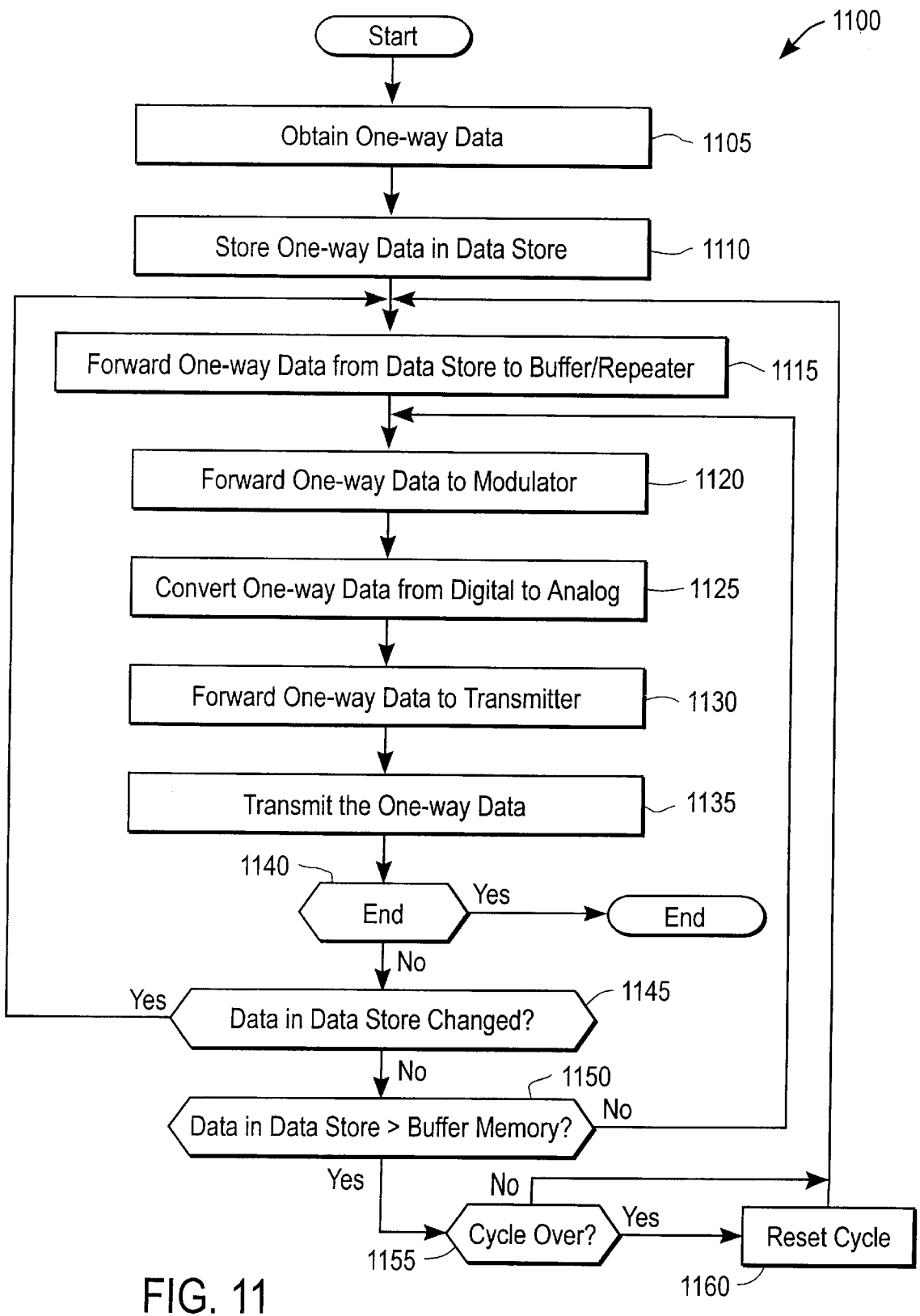
FIG. 11 is a block diagram illustrating a method of transmitting one-way data to viewer systems.

FIG. 11 is a flowchart illustrating a method 1100 for transmitting data 200. Method 200 begins with the viewer/user (not shown) or an input device (not shown) in step 1105 obtaining one-way data 165, preferably, already packetized. The data store 115 in step 1110 stores the one-way data 165. In step 1115, the data store 1115 forwards or the buffer/repeater 120 retrieves the one-way data 165, up to the maximum capacity of the buffer memory 510. The buffer/repeater 120 in step 1120 forwards the one-way data 165 to the modulator 125. The modulator 125 in step 1125 converts the data 165 from digital to analog, and in step 1130 forwards the data 165 to the transmitter 130. The transmitter 130 in step 1135 transmits the data 165, as data-being-transmitted 200, on transmission line 135.

System 100 in step 1140 determines whether to end the method 1100, e.g., because the system 100 has been turned off. If so, then method 1100 ends. Otherwise, the buffer/repeater 120 in step 1145 determines whether the data 165 stored in the data store 115 has been modified or replaced. If so, then method 1100 returns to step 1115 to obtain the new data 165 to transmit. Otherwise, the repeater engine 520 in the buffer/repeater 120 in step 1150 determines whether the data-to-be-transmitted 165 in the data store 115 is greater than the buffer memory 510 capacity. If not, then all data-to-be-transmitted 165 has been transferred to the buffer memory 510. Thus, the method 1100 returns to step 1120 to repeat the transmission process (i.e., at least steps 1120–1135). Otherwise, the repeater engine 520 determines whether the cycle is over. For example, if the buffer memory 510 capacity is 5 MB and the data-to-be transmitted 165 is 100 MB, then the repeater engine 520 determines that twenty (20) packages must be transmitted to complete the cycle. If the cycle is not over, then the method 1100 returns to step 1115 for the buffer/repeater 120 to obtain the next package for transmission. If the cycle is over, i.e., the transmitter 130 just transmitted the twentieth package, then the repeater engine 510 in step 1160 resets the cycle, and returns to step 1115 to retrieve the first package for transmission.

Figure 12A:
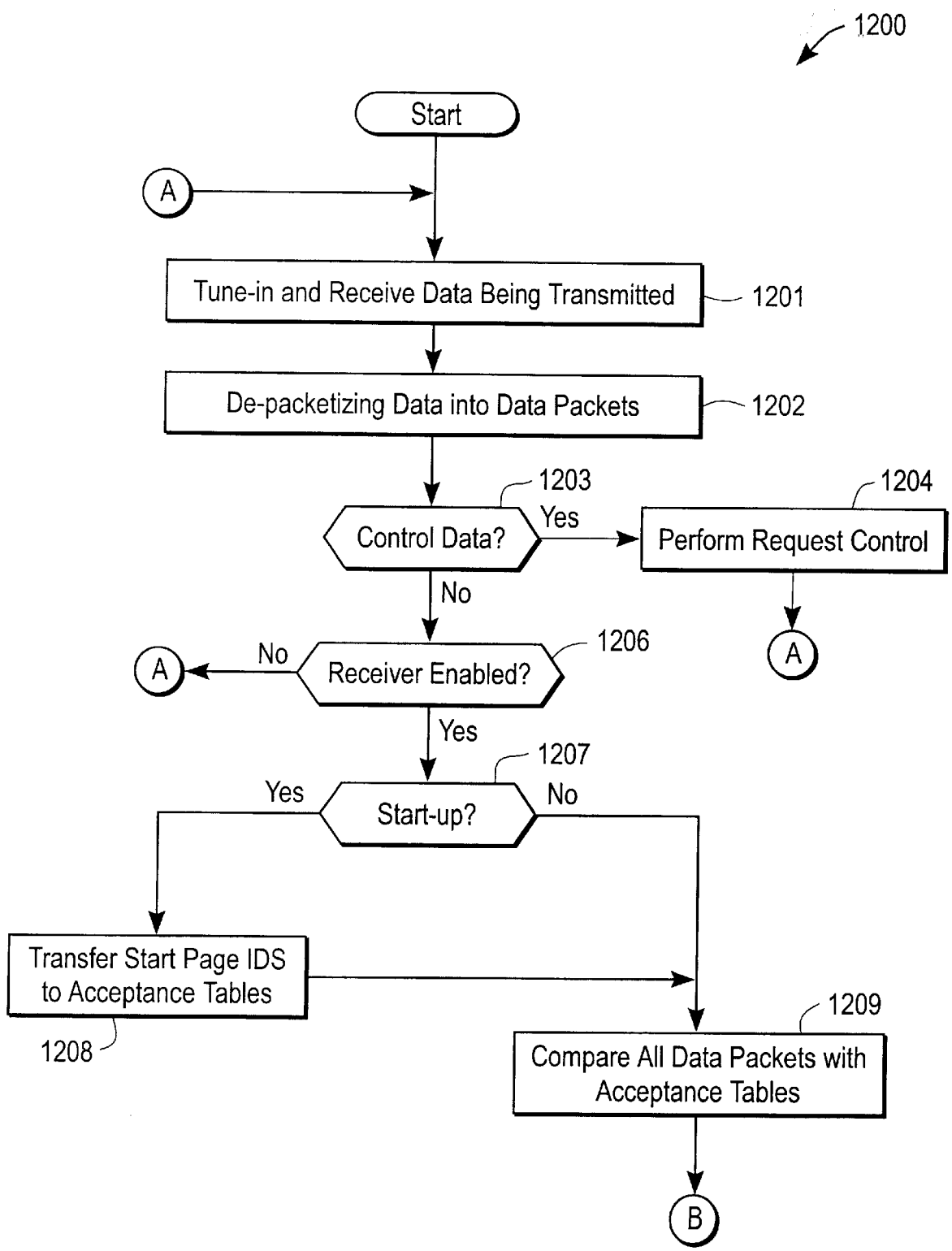
FIGS. 12A, 12B and 12C are a block diagram illustrating a method of receiving one-way data at a viewer system.
Figure 12B:
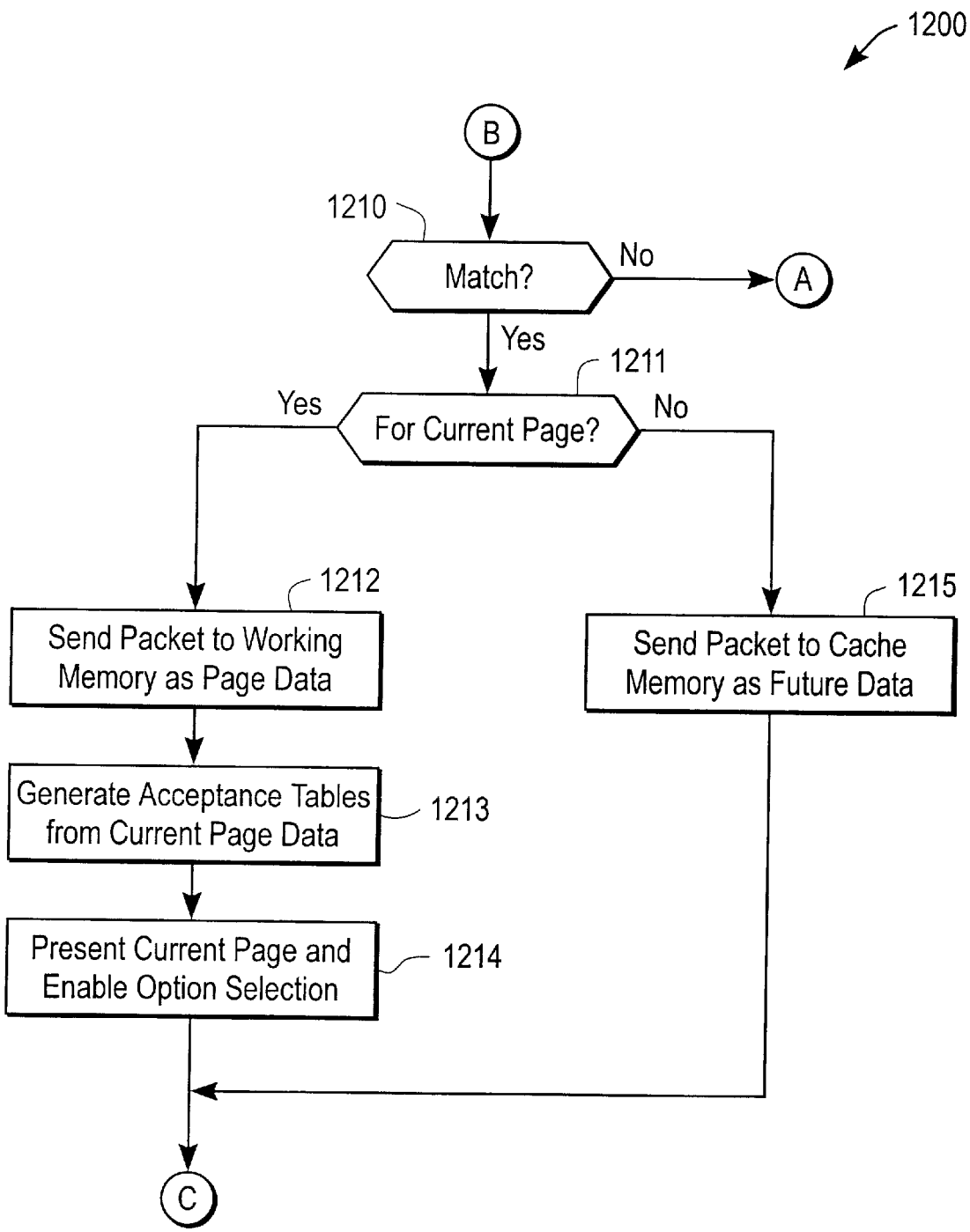
Figure 12C:
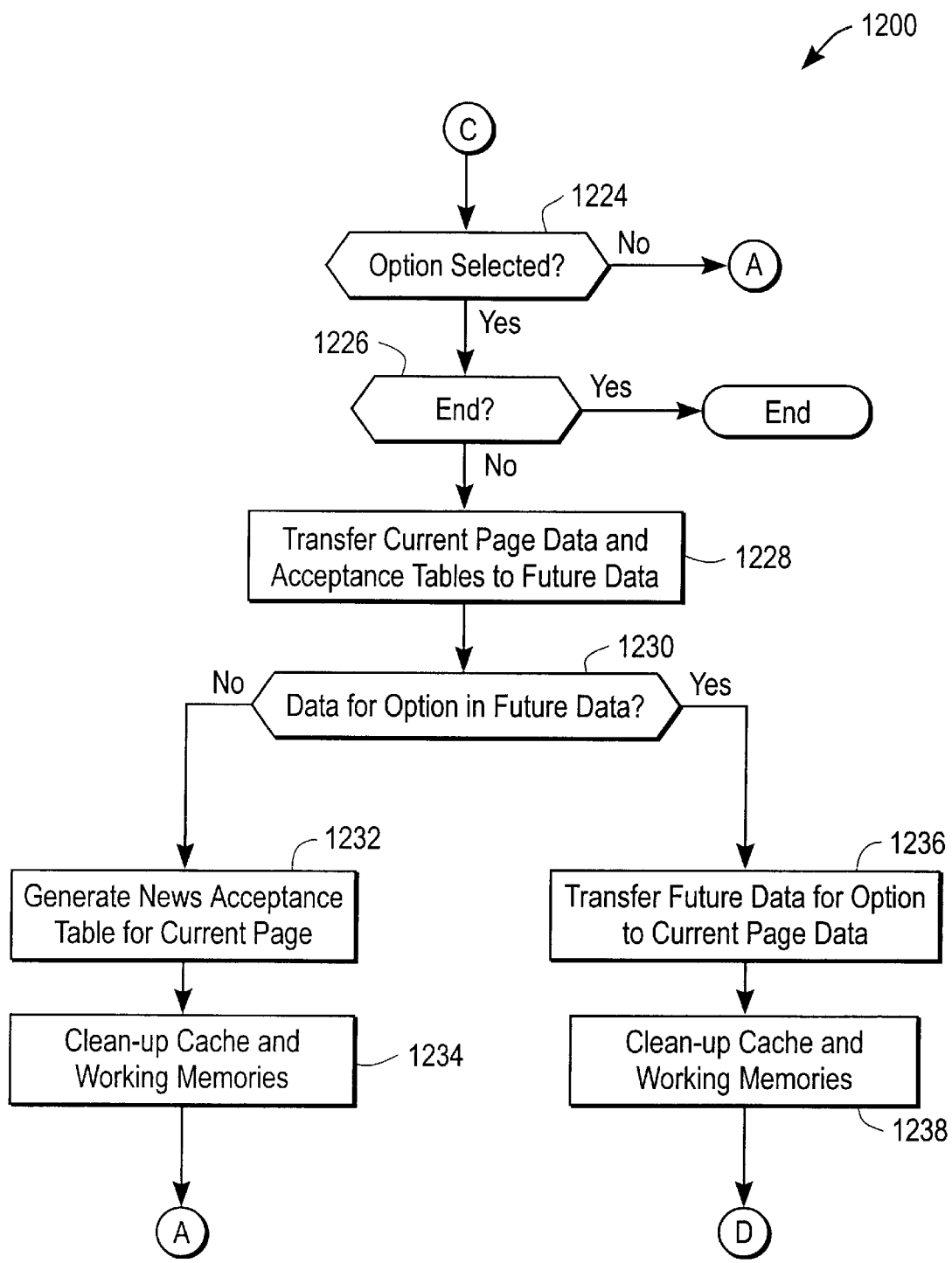

FIG. 12A is a flowchart illustrating a method 1200 for retrieving desired data from the data-being-transmitted 200. Method 1200 begins with the receiver and demodulator 635 in step 1201 tuning-in and receiving a data packet 205 from the data-being-transmitted 200 on transmission line 135, and forwarding the data 200 to the FPGA 645. The FPGA 645 in step 1202 de-packetizes the data 200 into data packets 205. The FPGA 645 in step 1203 determines whether the data packet 205 received contains control data 163 addressed to this set top box 140. This determination may be performed by comparing the data packet 1300 against the known control data IDs 609 stored in the ROM 607 and comparing the address 680 to addresses within the data packet 205.

If the data packet 205 contains control data 163 addressed to the set top box 140, then the FPGA 645 in step 1204 performs the requested control. For example, if the requested control is to enable or to disable the set top box 140, then the FPGA 645 sets the appropriate flag. If the control is to modify the existing version of service, then the FPGA 645 stores the new map 685 and start page IDs 675. Method 1200 then returns to step 1201. If the data packet 205 does not contain control data 163, then the FPGA 645 in step 1206 determines whether the receiver 140 has previously been enabled, i.e., whether a map 685 and start page IDs 675 have been previously stored in the FPGA 645. If not, then the method 1200 returns to step 1201. Otherwise, the FPGA 645 in step 1207 determines whether the system 100 has just been started up. If so, then the FPGA 645 in step 1208 transfers the start page IDs 675 to the acceptance tables 624 and method 1200 jumps to step 1209. If not, then method 1200 jumps directly to step 1209. In step 1209, the FPGA 645 compares the data packets 205 with the acceptance tables 624. Method 1200 then continues with FIG. 12B.

The FPGA 645 in step 1210 determines whether any data packets 205 match the comparison criteria (i.e., the channel and page IDs in the acceptance tables 624). If not, then the method 1200 returns to step 1201. Otherwise, the FPGA 645 in step 1211 determines whether the matching data packet 205 corresponds to the current page or to a future page. If the matching data packet 205 corresponds to the current page, then the FPGA 645 in step 1212 sends the packet to the working memory 620 as page data 622. The control engine 623 in step 1213 generates acceptance tables from the current page data 622, by retrieving and storing the channel and page IDs from the header of the data packet within the page data 622. The browser 625, graphics card 650 and output device interface 655 in step 1214 present the current page on the output device 145 and enable option 305/405 selection. Method 1200 then continues with step 1224. If the matching data packet 205 corresponds to a future page, then the FPGA 645 in step 1215 sends the packet 205 to the cache memory 610 as future data 615. Method 1200 then continues with step 1224 in FIG. 12C.

In step 1224, the browser 625 determines whether an option 305/405 has been selected and, if selected, informs the control engine 623. If not, then the method 1200 returns to step 1202. Otherwise, the control engine 623 in step 1225 determines if the option 305/405 selected was the "End" option (not shown). If the end option was selected, then method 1200 ends. Otherwise, the control engine 623 in step 1228 transfers the current page data 622 to the cache memory as future data 615 (in case the "previous page" option 405 is selected). The control engine 623 in step 1228 also transfers the acceptance tables 624 to the cache memory 610 as future data 615 (again, in case the previous page option 405 is selected).

The control engine 623 in step 1230 determines whether the data for the selected option 305/405 has been stored in the cache memory 610 as future data 615. If so, then the control engine 623 in step 1236 transfers the data for the selected option 305/405 from the future data 615 to the current page data 622. The control engine 623 in step 1238 cleans up the cache memory 610 and the working memory 620, by erasing the obsolete acceptance tables 624 and the obsolete page data 622 from working memory 620 and the obsolete future data 615 from cache memory 610. Method 1200 then returns to step 1220. If not stored in future data 615, the control engine 623 in step 1232 generates a new acceptance table 624 for the selected option 305/405, by adding the channel and page IDs for the selected page to the acceptance table 624. The control engine 623 in step 1234 cleans up the cache memory 610 and the working memory 610, by erasing all obsolete acceptance tables 624 and page data from working memory 610 and all future data 615 from cache memory 610. Method 1200 then returns to step 1202.

Returning back to page 1202 means that the set top box 140 must wait for the data 200 for the option 305/405 selected to arrive before it can be displayed. If the data 200 being waited for is a movie, then because of the length of the movie, it may take several minutes before the start of the movie data 200 resumes. Accordingly, a schedule of movies may be transmitted more often so that the set top box can inform the viewer/user of the start time for or count-down until the next movie. Further, the set top box 140 will switch to the channel 210 right before the movie starts.

One skilled in the art will recognize that the set top box 140 may include an operating system (not shown), which may be stored in working memory 620, for controlling processing by the processor 605. One skilled in the art will further recognize that the set top box 140 may also include additional elements, such as network connections, additional memory, additional processors, LANs, input/output lines for transferring information across a hardware channel, the Internet or an intranet, etc. One skilled in the art will also recognize that the programs and data may be received by and stored in the system in many ways. For example, a computer-readable storage medium (CRSM) reader (not shown) such as a magnetic disk drive, hard disk drive, magneto-optical reader, CPU, etc. may be coupled to the communications bus 630 for reading a computer-readable storage medium (CRSM) such as a magnetic disk, a hard disk, a magneto-optical disk, RAM, etc. Programs and data may be entered into the set top box 140 via the CRSM reader.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A receiver system, comprising:
    a set top box coupled to an output device, the set top box capable to extract and forward data to be displayed by the output device;
    the set top box including a receiver and demodulator stage for receiving data packets being transmitted on multiple channels;
    a device, coupled to the receiver and demodulator stage, for performing data de-packetization and for extracting a data packet from the received data packets based on a comparison of the received data packets and desired packet identification information, the device further configured to compare the received data packets with data identified by acceptance tables stored in a working memory, the device further configured to send the received data packets to the working memory as page data if the received data packets correspond to the data identified by the acceptance tables, the working memory coupled to the device;
    a browser, coupled to the device, for enabling presentation or an extracted data packet, and for enabling selection of an option; and
    a control engine, coupled to the device, for managing the desired packet identification information based on the extracted data packet, the control engine further configured to generate the acceptance tables;
    the set top box configured to receive a control data and recognize a selected version of service to enable processing of certain data on the output device, the control data including at least one of a set top box address, the selected version of service, a list of set top boxes to be enabled, a list of set top boxes to be disabled, a list of set top boxes to be modified, and a start page identification information based upon the selected version of service.

2. The system of claim 1, wherein the multiple channels correspond to a single frequency.

3. The system of claim 1, wherein the multiple channels correspond to multiple frequencies.

4. The system of claim 1, wherein each data packet includes identification information for comparison against the desired packet identification information to determine whether to extract the data packet.

5. The system of claim 4, wherein the identification information includes a channel ID and a page ID for comparison against the desired packet identification information.

6. The system of claim 5, wherein the device stores the extracted data packet in current page memory.

7. The system of claim 1, wherein the extracted data packet includes link information.

8. The system of claim 7, wherein the control engine adds the link information to the desired packet identification information to determine whether to extract other data packets.

9. The system of claim 8, wherein the device extracts other data packets and stores the other data packets in future page memory.

10. The system of claim 1, wherein the extracted data packet includes control data.

11. The system of claim 10, wherein the control data identifies a start page.

12. The system of claim 1, wherein the extracted data packet includes multimedia data.

13. The system of claim 1, wherein the desired packet identification information includes acceptance tables containing current page information and link information.

14. The system of claim 1, further comprising a signal receiver interface coupled to the browser for receiving a signal selecting the option.

15. The system of claim 1, wherein the control engine manipulates the desired packet identification information upon selection of the option.

16. A receiver method comprising:
    receiving a da packet being transmitted on a first channel;
    performing data de-packetization on the data packet and comparing the data packet against desired packet identification information to determine if the data packet is desired, including comparing the data packets with data identified by acceptance tables snored in a working memory and sending the data packets to the working memory as page data if the data packets correspond to the data identified by the acceptance tables;
    selecting the data packet if the data packet is desired;
    managing the desired packet identification information based on a selected data packet; and
    receiving a control data and recognizing a selected version of service to enable processing of certain data on an output device, the control data including at least one of a set top box address, the selected version of service, a list of set top boxes to be enabled, a list of set top boxes to be disabled, a list of set top boxes to be modified, and a start page identification information based upon the selected version of service.

17. The method of claim 16, wherein the first channel corresponds to a first frequency.

18. The method of claim 17, further comprising receiving a second data packet on a second channel corresponding to the first frequency.

19. The method of claim 17, further comprising receiving a second data packet on a second channel corresponding to a second frequency.

20. The method of claim 17, wherein the data packet includes a channel ID and a page ID, and wherein the step of comparing includes comparing the channel ID and page ID against the desired packet identification information.

21. The method of claim 17, wherein each data packet includes link information.

22. The method of claim 21, where in the step of managing the desired packet information includes adding the link information to the desired packet identification information.

23. The method of claim 22, further comprising receiving other data packets, and selecting another data packet from the other data packets based on the link information.

24. The method of claim 23, further comprising receiving a signal selecting the option.

25. The method of claim 24, further comprising manipulating the desired packet identification information upon selection of the option.

26. A receiver system comprising:
a set top box coupled to an output device, the set top box capable to extract and forward data to be displayed by the output device;
the set top box including a means for receiving a data packet being transmitted on a first channel;
means for performing data de-packetization on the data packet and for comparing the data packet against desired packet identification information to determine if the data packet is desired, including means for comparing the data packets with identified by acceptance tables stored in a working memory and for sending the data packets to the working memory as page data if the data packets correspond to the data identified by the acceptance tables;
means for selecting the data packet if the data packet is desired; and
means for managing the desired packet identification information based on a selected data packet and for generating the acceptance tables;
the set top box configured to receive a control data and recognize a selected version of service to enable processing of certain data on the output device, the control data including as least one of a set top box address, the selected version of service, a list of set top boxes to be enabled, a list of set top boxes to be disabled, a list of set top boxes to be modified, and a start page identification information based upon the selected version of service.

27. A computer-readable storage medium storing program code for causing a computer to perform a method of:
receiving a data packet being transmitted on a first channel;
performing data de-packetization on the data packet and comparing the data packet against desired packet identification information to determine if the data packet is desired, including comparing the data packets with data identified by acceptance tables stored in a working memory and sending the data packets to the working memory as page data if the data packets correspond to the data identified by the acceptance tables;
selecting the data packet if the data packet is desired;
managing the desired packet identification information based on a selected data packet; and
receiving a control data and recognizing a selected version of service to enable processing of certain data on an output device, the control data including at least one of a set top box address, the selected version of service, a list of set top boxes to be enabled, a list of set top boxes to be disabled, a list of set top boxes to be modified, and a start page identification information based upon the selected version of service.

28. A receiver system, comprising:
a set top box coupled to an output device, the set top box capable to extract and forward data to be displayed by the output device;
the set top box including a receiver for receiving a data packet containing data, identification information, and linking information corresponding to at least one option;
first memory for storing current page data packets;
second memory for storing potential page data packets;
third memory for storing desired current page packet information;
fourth memory for storing desired potential page packet information;
a device coupled to the receiver, the third memory and the fourth memory for performing data de-packetization on the data packet and for comparing the identification information against the desired current page packet information and against the desired potential page packet information, coupled to the first memory for transferring the received data packet to the first memory according to the comparison of the identification information and the desired current page information, and coupled to the second memory for transferring the received data packet to the second memory according to the comparison of the identification information and the desired potential page packet information;
a browser coupled to the first memory for presenting the data for a current page data packet stored in the first memory; and
a control engine coupled to the first memory, the third memory and the fourth memory for manipulating the desired current page packet information and the desired potential page packet information based on the current page data packet stored in the first memory;
the set cop box configured to receive a control data and recognize a selected version of service to enable processing of certain data on the output device, the control data including at least one of a set top box address, the selected version of service, a list of set top boxes to be enabled, a list of set top boxes to be disabled, a list of set top boxes to be modified, and a start page identification information based upon the selected version of service.

29. The system of claim 28, wherein the identification information includes a channel ID and a page ID.

30. The system of claim 28, wherein the device includes an FPGA.

31. The system of claim 28, further comprising a signal receiver interface coupled to the browser for receiving a signal selecting the option.

32. The system of claim 31, wherein the control engine manipulates the desired current page packet information upon selection of the option.

33. The system of claim 32, wherein the control engine retrieves from the second memory the data packet corresponding to the linking information which corresponds to the selected option, and stores it in the first memory.

34. The system of claim 32, wherein the second memory does not store the data packet corresponding to the linking information which corresponds to the selected option, and wherein the control engine adds the linking information to the third memory as desired current page packet information.

35. The system of claim 34, wherein, upon selection of the option, the control engine cleans up the first, second, third and fourth memories.

36. The system of claim 28, wherein, upon system start-up, the third memory stores start page information as the desired current page packet information.

37. A receiver method, comprising:
receiving a data packet containing data, identification information, and linking information corresponding to at least one option;
performing data de-packetization on the data packet and comparing the identification information against desired current page packet information corresponding to at least one option;

transferring the received data packet to first memory as a current page data packet when the comparison of the identification information matches the desired current page information;

transferring the received data packet to second memory when the identification information matches the desired potential page packet information;

presenting the data for a current page data packet stored in the first memory;

manipulating the desired current page packet information and the desired potential page packet information based on the current page data packet stored in the first memory; and receiving a control data and recognizing a selected version of service to enable processing of certain data on an output device, the control data including at least one of a set top box address, the selected version of service, a list of set top boxes to be enabled, a list of set top boxes to be disabled, a list of set top boxes to be modified, and a start page identification information based upon the selected version or service.

38. The method of claim 37, wherein the identification information includes a channel ID and a page ID.

39. The method of claim 38, further comprising receiving a signal selecting the option.

40. The method of claim 39, wherein manipulating occurs upon selection of the option.

41. The method of claim 40, further comprising retrieving from the second memory the data packet corresponding to the linking information which corresponds to the selected option, and storing it in the first memory.

42. The method of claim 40, further comprising adding the linking information to the desired current page packet information.

43. The method of claim 42, wherein , upon system start-up, the desired current page packet information includes start page information.

44. A receiver system, comprising:

a set top box coupled to an output device, the set top box capable to extract and forward data to be displayed by the output device;

the set top box including a means for receiving a data packet containing data, identification information, and linking information corresponding to at least one option;

means for performing data de-packetization on the data packet and for comparing the identification information against desired current page packet information and against the desired potential page packet information;

means for transferring the received data packet to first memory as a current page data packet when the comparison of the identification information matches the desired current page information;

means for transferring the received data packet to second memory when the identification information matches the desired potential page packet information;

means for presenting the data for a current page data packet stored in the first memory; and means for manipulating the desired current page packet information and the desired potential page packet information based on the current page data packet stored in the first memory;

the set top box configured to receive a control data and recognize a selected version of service to enable processing of certain data on the output device, the control data including at least one of a set top box address, she selected version of service, a list of set top boxes to be enabled, a list of set top boxes to be disabled, a list of set top boxes to be modified, and a start page identification information based upon the selected version of service.

45. A computer-readable storage medium storing program code for causing a computer to perform a method of:

receiving a data packet containing data, identification information, and linking information corresponding to at least one option;

performing data de-packetization on the data packet and comparing the identification information against desired current page packet information and against the desired potential page packet information;

transferring the received data packet to first memory as a current page data packet when the comparison of the identification information matches the desired current page information;

transferring the received data packet to second memory when the identification information matches the desired potential page packet information;

presenting the data for a current page data packet stored in the first memory;

manipulating the desired current page packet information and the desired potential page packet information based one the current page data packet stored in the first memory;

receiving a control data and recognizing a selected version of service to enable processing of certain data on the output device, the control data including at least one of a set top box address, the selected version of service, a list of set top boxes to be enabled, a list of set top boxes to be disabled, a list of set top boxes to be modified, and a start page identification information based upon the selected version of service.

46. A transmission system, comprising:

a buffer memory storing data-to-be-transmitted, which contains channel information;

a transmitter, coupled to the buffer memory, for transmitting the stored data based on the channel information; and a repeater coupled to the buffer memory and to the transmitter for repeatedly sending the stored data from the buffer memory to the transmitter, the repeater including a repeater engine that stores the data in the buffer memory and that repeatedly transmit the data from the buffer memory to the transmitter;

the transmitter capable to transmit a control data and a selected version of service to enable processing of certain data on an output device, the control data including at least one of set top box address, the selected version of service, a list of set top boxes to be enabled, a list of set top boxes to be disabled, a list of set top boxes to be modified, and a start page identification information based upon the selected version of service.

47. A system comprising:

receiving data packets for multiple instances of a presentation;

receiving a control data and recognizing a selected version of service to enable processing of certain data on an output device, the control data including at least one of a set top box address, the selected version of service, a list of set top boxes to be enabled, a list of set top boxes to be disabled, a list of set top boxes to be modified, and a start page identification information based upon the selected version of service;

the receiving the control data including:

receiving a program guide, which contains data for offering selection of one of the instances and containing identification information for enabling extraction of each of the instances;

using the data to present the program guide;

enabling section of an instance presented by the program guide;

receiving the selection of an instance;

using the identification information to extract data packets for the selected instance from the received data packets; and presenting dynamically the data packets for the selected instance.

\* \* \* \* \*

UNITED STATES PATENT AND TRADEMARK OFFICE
CERTIFICATE OF CORRECTION

PATENT NO. : 6,360,275 B1
DATED : March 19, 2002
INVENTOR(S) : Phillip L. Chu et al.

It is certified that error appears in the above-identified patent and that said Letters Patent is hereby corrected as shown below:

Column 13,
Line 37, change "or an extracted data packet," to -- of an extracted data packet, --

Column 14,
Line 24, change "receiving a da packet" to -- receiving a data packet --
Line 29, change "identified by acceptance tables snored" to --identified by acceptance tables stored --
Line 59, change "The method of claim 21, where in" to -- The method of claim 21, wherein --

Column 15,
Line 14, change "comparing the data packets with identified" to -- comparing the data packets with data identified --
Line 28, change "data including as least one of a set top box" to -- data including at least one of a set top box --

Column 16,
Line 27, change "the set cop box configured to receive" to -- the set top box configured to receive --

Column 17,
Line 23, changed "based upon the selected version or service." to -- based upon the selected version of service. --

Column 18,
Line 2, change "data including at least one of a set top box address, she" to -- data including at least one of a set top box address, the --
Line 29, change "one the current page data packet" to
-- on the current page data packet --

UNITED STATES PATENT AND TRADEMARK OFFICE
CERTIFICATE OF CORRECTION

PATENT NO.   : 6,360,275 B1
DATED        : March 19, 2002
INVENTOR(S)  : Phillip L. Chu et al.

It is certified that error appears in the above-identified patent and that said Letters Patent is hereby corrected as shown below:

Column 20,
Line 1, change "enabling section of an instance presented" to -- enabling selection of an instance presented --

Signed and Sealed this

Eighteenth Day of June, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,360,275 B1
DATED         : March 19, 2002
INVENTOR(S)   : Phillip L. Chu et al.

It is certified that error appears in the above-identified patent and that said Letters Patent is hereby corrected as shown below:

<u>Title page,</u>
Item [75], add the following inventor -- David Z. Zhang, San Mateo, California -- to "Inventors: Phillip L. Chu, Sunnyvale; George Guoqiang Lin, Cupertino, both of CA (US)"

Signed and Sealed this

Tenth Day of December, 2002

JAMES E. ROGAN
*Director of the United States Patent and Trademark Office*